(12) United States Patent
Carbain

(10) Patent No.: US 7,453,989 B1
(45) Date of Patent: Nov. 18, 2008

(54) METHOD AND APPARATUS FOR TESTING A SUBSCRIBER LOOP-BASED SERVICE

(75) Inventor: Joseph Carbain, Brick, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 29 days.

(21) Appl. No.: 11/341,358

(22) Filed: Jan. 27, 2006

Related U.S. Application Data

(63) Continuation of application No. 10/401,072, filed on Mar. 27, 2003, now Pat. No. 7,200,206.

(51) Int. Cl.
  *H04M 1/24* (2006.01)
  *H04M 3/06* (2006.01)
  *H04M 3/22* (2006.01)

(52) U.S. Cl. .................. 379/27.01; 379/1.01; 379/1.03; 379/22.01

(58) Field of Classification Search ............. 379/1.01, 379/1.03, 1.04, 14.01, 15.05, 22.01, 22.02, 379/22.03, 22.04, 27.01–27.03, 29.09, 32.01, 379/32.04, 9.05, 112.02, 399.01, 413.02, 379/413.03
See application file for complete search history.

(56) References Cited

U.S. PATENT DOCUMENTS

| | | | | |
|---|---|---|---|---|
| 4,260,859 | A | * | 4/1981 | Aaroen ..................... 379/2 |
| 6,920,320 | B2 | * | 7/2005 | Rathunde et al. ......... 455/422.1 |
| 2002/0087823 | A1 | * | 7/2002 | Chow et al. ............... 711/170 |

* cited by examiner

*Primary Examiner*—Quoc D Tran

(57) ABSTRACT

A network interface device is positioned between a subscriber loop and the internal wiring of a subscriber's premise. Operational and performance data is captured and stored in memory for later use and analysis. Commands issued to the network interface device selectively loop-back transmitted data at either the network or subscriber side of the network interface device and/or selectively engage or disengage one or more of the addressed subscriber and premise loops.

14 Claims, 3 Drawing Sheets

US 7,453,989 B1

METHOD AND APPARATUS FOR TESTING A SUBSCRIBER LOOP-BASED SERVICE

This application is a continuation of prior application Ser. No. 10/401,072 filed Mar. 27, 2003 now U.S. Pat. No. 7,200,206 which is hereby incorporated by reference herein in its entirety.

FIELD OF THE INVENTION

The disclosed invention broadly relates to a method and apparatus for testing a communications link between a central office and a subscriber terminating equipment.

BACKGROUND OF THE INVENTION

Twenty years ago, a second telephone line was primarily used as an alternate means of accessing a remote network or computer without tying-up the primary phone line. Since then the telecommunications industry has experienced a phenomenal growth in demand for additional telephone lines and in the way we communicate and process information. For example, during the fax revolution of the mid-1980's, homes and businesses alike discovered a need for having ready access to multiple facsimile machines in order to keep pace with the ever increasing work-at-home lifestyle and the 24×7 accessibility requirements of the busy executive. Just about every business, poised for the new business environment, used fax technology to transport documents and relay data. As a consequence, the demand for POTS or plain old telephone services skyrocketed to new heights. In fact, it was not uncommon for business correspondences to designate primary and secondary facsimile telephone numbers as alternative means of accessing businesses and individuals alike.

In similar fashion, the Internet explosion of the 1990's significantly increased the already burgeoning demand for additional phone lines. In particular, demand for additional subscriber loops as reflected in digital subscriber line service ("DSL"), for example, outpaced most forecasts. The speed of Internet access offered by DSL, was simply unrivaled by the traditional DDD line. In its fastest incarnation, DSL offers more than 100 times the network performance of a traditional modem. While the precise speed of a connection depends on the variety of xDSL deployed, even a basic ADSL setup outperforms the traditional modem by a factor of 20 or more. Internet access such as DSL service provides broadband access over existing copper telephone wires—those same wires that have been used for voice grade service and which have been in demand for fax service and traditional computer access.

However, because internet access relies on the use of a subscriber loop, such services are not always available to everyone. To be eligible for DSL service, for example, the phone line or the subscriber loop must first be "qualified." More specifically, the home or business must be located within the distance limitations of the DSL service. Generally this means that the distance of the subscriber loop may be no longer than approximately 18,000 feet (3.4 miles) from the central office or public exchange to the subscriber location. Moreover, the subscriber loop must possess certain electrical transmission characteristics which will assure reliability and quality of service.

Once installed, DSL service, like all other services, is subject to service disruptions. The subscriber loop may be subject to thermal noise, crosstalk, and attenuation. To correct or re-qualify the service, the phone company or service provider is often forced to send field personnel to isolate the problem. However, such service calls are often unwarranted since the cause of the service disruption is often not within the subscriber loop or within the control of the service provider, but rather within the wiring at the subscriber premise. Accordingly, there is a need for a method and system that would mitigate the need for sending field personnel to investigate every subscriber-loop-based service outage and that would provide automatic and immediate data necessary for isolating and restoring service.

SUMMARY

The present invention provides a method and apparatus for testing and isolating the cause of a service failure. A network interface device is positioned between a subscriber loop and the internal wiring of a subscriber's premise. Operational and performance data is captured and stored in memory for later use and analysis. Commands issued to the network interface device selectively loop-back transmitted data at either the network or subscriber side of the network interface device and/or selectively engage or disengage one or more of the addressed subscriber and premise loops. A maintenance telephone line is connected to a network jack to function as a simulated subscriber or premise loop in order to isolate the cause of the service failure.

BRIEF DESCRIPTION OF THE DRAWINGS

These and other features of the present invention will best be understood by reference to the following brief description of a preferred embodiment of the invention, taken in conjunction with accompanying drawings, in which.

DETAILED DESCRIPTION

The present invention generally relates to a method and apparatus for testing the communications link between a central office and a customer's terminating equipment. Although the present invention is described in the context of xDSL services to access the Internet, it has a broader application. In particular, the invention may be useful in other communications, data, and information systems that employ the use of a subscriber loop to access equipment at a service providers point-of-presence.

Figure 1:
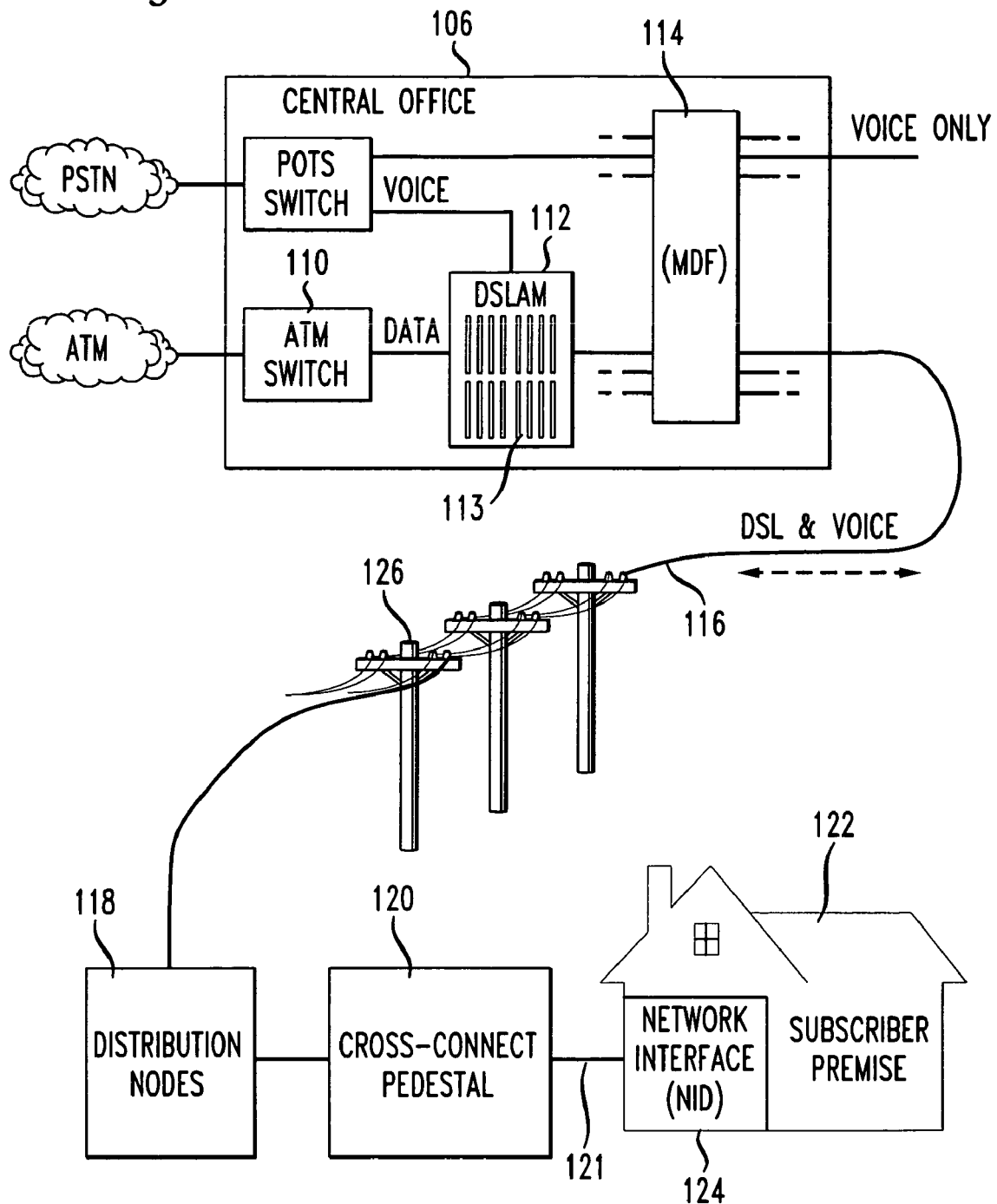
FIG. 1 illustrates a subscriber loop from a central office to a customer's premise.

FIG. 1 illustrates the distribution of a subscriber loop 116 typically used to provision DSL services from a central office 106 to a customer premise 122. As shown, subscriber loop 116 is terminated at the central office end to a digital subscriber line access multiplexer (DSLAM) 112. The DSLAM 112 combines several subscriber loops 116 into a high-capacity connection and interfaces with an Asynchronous Transfer Mode switch (ATM switch) 110 to interconnect a subscriber to the Internet. Within the DLAM 112, each subscriber loop 116 is terminated to a subscriber interface card, otherwise known as an ATU-C card 113. The ATU-C card 113 is a subscriber interface board comprising a processor, memory, interface and loop-back circuitry, modulation and demodulation circuitry and resident software necessary for processing, monitoring and conducting diagnostic testing on the subscriber loop 116. At the central office (CO) 106, an intra-CO connection is made between the DSLAM 112 at one end and a main distribution frame (MDF) 114 at the other end. At the MDF 114, internal wiring is assigned to cross-connect the designated ATU-C card 113 to a selected four-wire external cable or subscriber loop 116. The subscriber loop 116 is distributed or laid-out from the CO 106 as a buried cable or aerial cable or a combination of both. Along the path of distribution, the subscriber loop 116 may be placed on top of telephone poles 126 or buried in protective conduit or in sheathed cable having an armored sheath as protection. Distribution of the subscriber loop 116 may include distribution nodes 118 (field Telco closets) where directional changes to the layout of the subscriber loop 116 may be made to reach a subscriber premise 122. As shown in FIG. 1, the subscriber loop 116 is cross-connected to a specific cable drop 121 at cross-connect pedestal 120. The cable drop 121 is connected to a network interface device (NID) 124 which functions among other things as a demarcation point between the service provider's cable plant and the subscriber's internal wiring (premise loop 226). Operationally, the demarcation is important in that network side cables and related equipment are the exclusive property and maintenance responsibility of the service provider. Conversely, the subscriber side of the NID 124 is the property and maintenance responsibility of the subscriber.

Figure 2:
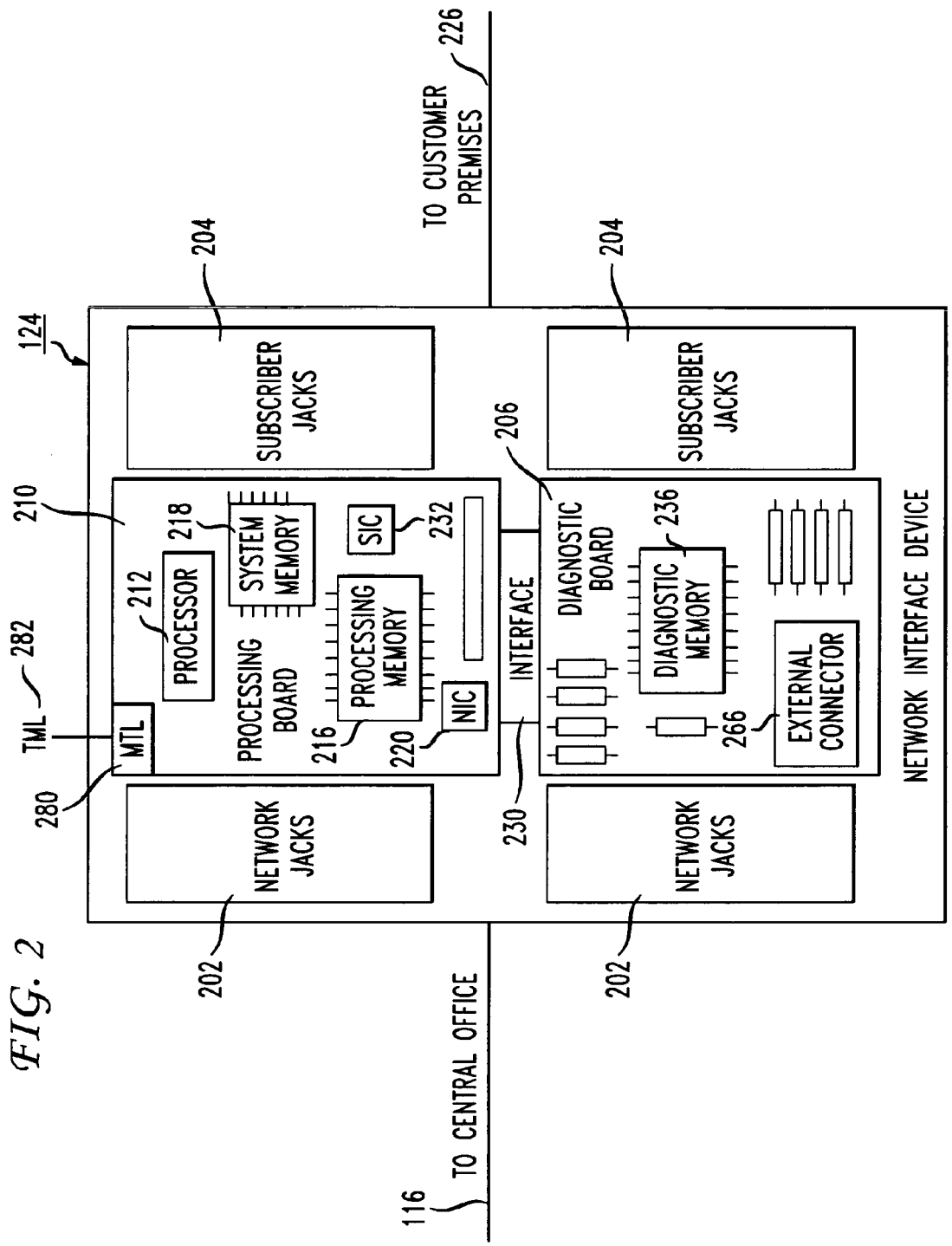
FIG. 2 illustrates a network interface device used in the monitoring and testing of subscriber loop-based services.

FIG. 2 illustrates the functional components of the NID 124. Subscriber loop 116 is connected in one of many network cross-connect posts or jacks (network jacks) 202. Although the network cross-connect jacks 202 are shown as modular jack type connections, these cross-connects may be wrap-around post type connections or any other cross-connect means known in the art. Each of these network jacks 202 are connected to network interface circuitry (NIC) 220 on processing board 210. The NIC 220 comprises electronic components and related circuitry necessary to provide loop-back capabilities and to comply with established terminating standards and specifications of the provisioned services. To accommodate the variations in the various physical and electrical interface standards and specifications, the interface types available on NIC 220 are preferably remotely and manually selectable. In particular, a set of physical and electrical interface characteristics that may be required to interface with subscriber loop 116 may be selected through one or more commands initiated by test equipment or the ATU-C 113 at the CO 106 or by commands initiated by subscriber terminating equipment (STE) connected to the subscriber side of the NID 124. Moreover, the NIC 220 may upon the execution of a command sent to processor 212, engage or disengage a connection to any one of the network jacks 202.

In much the same way that network jacks 202 are connected to network interface circuitry 220, subscriber jacks 232 are connected to subscriber interface circuitry (SIC) 232. Premise loop 226 is connected to one of many subscriber cross-connect posts or jacks (subscriber jacks) 204. Again, these subscriber jacks 204 may be modular or configured as wrap-around post type connections or any other cross-connect means known in the art. Each of these subscriber jacks 204 are connected to subscriber interface circuitry (SIC) 232 on processing board 210. The SIC 232 comprises electronic components and related circuitry necessary to provide loop-back capabilities and to comply with established terminating standards and specifications of the STEs and the provisioned services. The interface types available on SIC 232 are preferably remotely and manually selectable. In particular, a set of physical and electrical interface characteristics that may be required to interface with premise loop 226 may be selected through one or more commands initiated by test equipment or the ATU-C 113 at the CO 106 or by commands initiated by the STE connected to the subscriber premise side of the NID 124. Moreover, the SIC 232 may upon the execution of a command sent to processor 212, engage or disengage a connection to any one of the subscriber jacks 204.

Processing board 210 contains a processor 212, processing memory 216, and modulation/demodulation circuitry for processing, monitoring and managing the condition of the subscriber loop 116 and the premise loop 226. As transmission data flows to and from the network side and the subscriber side of the NID 124, transmission data is stored initially in processing memory 216. In addition to storing transmission data, processor 212 monitors the subscriber loop 116 and the premise loop 226 and generates operational data which chronicles the condition and transmission status and characteristics of both the subscriber loop 116 and premise loop 226. In particular, transmission data passing through the NID 124, in either direction, is tapped or accessed by the NIC 220 and SIC 232 and forwarded to processor 212. Processor 212 continuously transfers the transmission data and operational data to a processing memory 216 (short-term memory). Such data is stored for temporary storage in processing memory 216 on a first-in first-out basis (FIFO). To make memory space available for new incoming data, the oldest stored transmission and operational data is deleted. In the event of a disruption in service or the detection of an anomaly, all or a portion of the transmission and operational data is stored in long-term memory. The processing memory 216 is preferably a non-volatile memory such as PROMs, EPROMs and EEPROMS and has a capacity to store and correlate transmission and operational data. Preferably operational data is stored by correlating the operational data with transmission data such that condition of either the subscriber loop 116 or the premise loop 226 may be correlated with the transmission data passing through the NID 124. In this manner, operational data indicative of the status of subscriber loop 116 and premise loop 226 and corresponding transmission data may be used to further analyze and detect possible causes of the service failure.

Processor 212 is in direct control of processing memory 216 and diagnostic memory 236. When a service failure or an error condition is detected, processor 212 sends in accordance with resident operating system and application software stored in system memory 218, all or a portion of the operational and transmission data stored in processing memory 216 just prior to and after the occurrence of the service failure to diagnostic memory 236 for long term storage. Diagnostic memory 236 is preferably non-volatile such as PROMs, EPROMs and EEPROMS and has a high storage capacity and a capacity to store multiple events in order to assess and correlate patterns of disruption or anomalies. If for example, an anomaly or disruption of service is detected, processor 212 will forward all or a portion of the operational and transmission data stored in processing memory 216 to diagnostic memory 236 for longer-term storage. The transfer of data from the processing memory 216 to the diagnostic memory 236, however, does not erase or delete the operational or transmission data already stored in processing memory 216. Only upon the subsequent capture of transmission and operational data and an exhaustion of the processing memory 216, will the data be deleted to make way for new data. In this manner, service failures or disruptions are noted and stored in diagnostic memory 236 for later analysis.

Diagnostic board 206 like processing board 210 is modular and interchangeable within the housing of the NID 124. Data is transferred between the processing board 210 and diagnostic board 206 through interface board connector 230. In addition, diagnostic board 206 comprises an external connector 266 for connecting external diagnostic equipment such as a bit error rate tester (BERT) or a logic analyzer. Depending on the current or anticipated type of subscriber loop-based service, the processing and/or diagnostic boards 210, 206 may be modularly replaced and remotely updated. Moreover, the processing and diagnostic boards 210, 206 are each uniquely and remotely addressable and configurable to serve the one or more specific services supported by NID 124.

Figure 3:
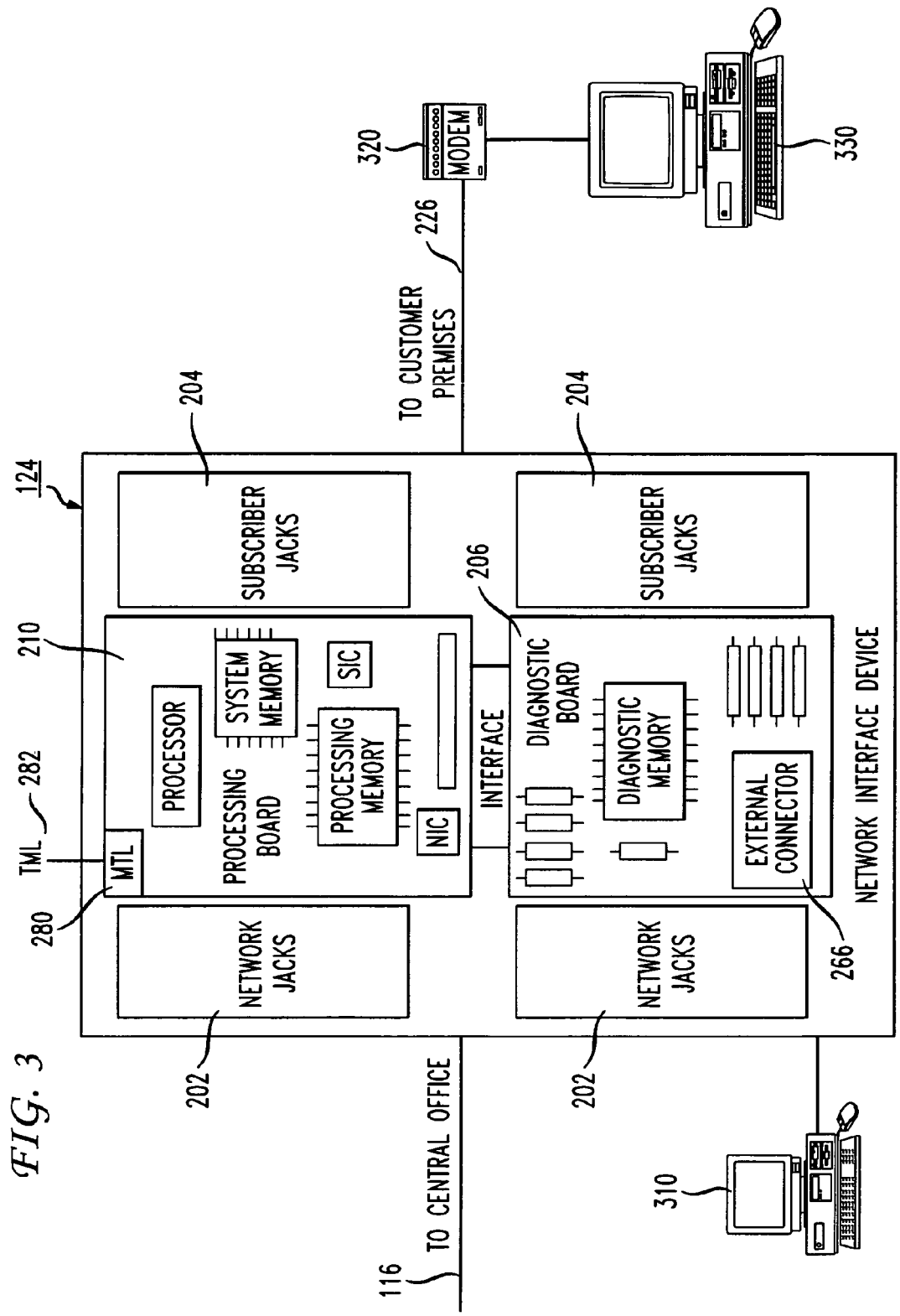
FIG. 3 illustrates the network interface device in communication with central office transmission equipment and subscriber terminating equipment.

As shown in FIG. 3, NID 124 functions as a point of demarcation between network and premise equipment and connects the subscriber loop 116 with premise loop 226. The modem 320 functions as part of the STE and connects the computer 330 to premise loop 226. Operationally, digital data transmitted by computer 330 is sent to modem 320 for modulation of the data onto a data carrier for transmission to the CO 106. The method of modulation is dependent upon the specific service to be provided and the specific technical standards in place to provide equipment compatibility.

Generally, DSL service utilizes either Carrier-less Amplitude Phase (CAP) or Discrete Multi-Tone (DMT) transmission schemes to modulate the carrier signal. However, DMT is an industry standard and is the preferred method of modulation for DSL equipment manufacturers. Under the DMT scheme of transmission, the available bandwidth (above voice bandwidth (4 kHz) and below 1 MHz) is divided into two hundred and forty-seven (247) channels—each channel comprised of a 4 kHz bandwidth. Data is distributed over the 247 channels, based on the carrying availability and capacity of each channel. Because higher-frequency signals on copper subscriber loops suffer more loss due to noise and attenuation than lower-frequency signals, more data is sent on the lower frequencies than on the higher frequencies. Each channel is monitored and in the event that the quality of transmission is impaired, the transmission signal is shifted to an alternate channel. In addition, some of the lower channels such as those starting above 8 kHz are used as bidirectional channels for upstream and downstream transmission.

In the event of a disruption or service failure, a subscriber may initiate an investigation of the cause of the failure by disengaging the subscriber loop 116 and then placing the subscriber side of the NID 124 in a loop-back mode of operation. Diagnostic software resident on computer 330 executes a series of diagnostic routines to isolate the source of the transmission problem. However, its should be understood that it is preferable that during each subsequent testing of the NID 124, subscriber loop 116 and premise loop 236, a reset command is sent to the NID 124 to place the NID 124 in a normal mode of operation. A disengage command is sent to the NID 124 for NIC 220 to specifically disengage (disconnect) and isolate the subscriber loop 116 associated with the service failure. A local loop-back command is sent to the NID 124 for the SIC 232 to loop-back the premise loop 226 on the subscriber side of the NID 124. Since the actual command structure for such loop-back and disengage commands as well other diagnostic commands are system specific, they will not be discussed herein. To test the premise loop 226, a series of test data streams such as alternating ones and zeroes (1,0,1, 0,1,0,1,0,1,0 etc.) or pseudo-random data streams may be sent by computer 330 to the NID 124 for immediate re-transmission. Depending on the manner in which the particular service operates, a demodulation/modulation function may be required. More specifically, data sent on an upstream carrier may not utilize the same downstream carrier frequency or frequency range such that in order to operate within the expected receive frequency range of the modem 320, a demodulation of the received data at the NID 124 may be required. The demodulated digital data may then be modulated onto a carrier frequency within the expected receive frequency or frequency range of modem 320. Accordingly, the NID 124 contains a modulator and demodulator within the NIC 220 and SIC 232, under the control of processor 212 for processing loop-back commands at both the network and subscriber side of the NID 124. Because as a general proposition, DSL services exist on the same copper wires that voice services are provide, the selection of transmission carrier frequencies should be selected to be close to, but above the low pass filters bandwidth used to provide voice grade services (i.e., above 4 kHz).

Looped-back data received by modem 320 is compared to the series of data streams sent upstream and a bit-error-rate is determined. To further investigate the source of the service failure, computer 330 through its diagnostic software, sends out a command to the NID 124 to fetch from diagnostic memory 236, operational and transmission data which details the operational environment correlated with the transmission data stored in diagnostic memory 236. Preferably, the operational and transmission data received represent data just prior to and after the occurrence of the service failure. The operational and transmission data is transmitted downstream to computer 330 where it is displayed. Generally, such transmission and service failure data will disclose error conditions such as loss of carrier, response timeouts, and failure to comply with protocol specific acknowledgements and certain other transmission requirements and processes. More specifically, computer 330 will based on its analysis of the operational and transmission data initiate other testing routines which may simulate and detect the cause of the service failure.

To eliminate the NID 124 as the source of the service failure, NID 124 will store in diagnostic memory 236, the operational status and detected error conditions of the NID 124 as they occur as operational data. The NID 124, at predetermined time intervals or in the event of a service failure, will store NID 124 operating information such as the type, time and frequency of detected transmission errors as wells as the number of re-transmissions required to correctly receive and verify the data.

Moreover operational and transmission data captured by the NID 124 may be compared to the actual transmission data received by computer 330 just prior to and after the occurrence of the service failure. Operational and transmission data actual received at computer 330 may show a significantly higher bit-error-rate at the computer 330 than the same data captured at the NID 124. Under these circumstances, an initial assessment may point to the premise loop 226 as the source of the problem—thus, for example, necessitating the change or re-adjustment of connectors, and/or cables.

The NID 124 may also be accessed directly to investigate the source of the service failure. As shown in FIG. 3, an external diagnostic interface 266 is provided on diagnostic board 206 as an interconnection point for a testing device 310, such as a laptop computer, logic analyzer, bit-error-rate tester and the like, to initiate diagnostic testing at the point of demarcation. The testing device 310 may test the premise loop 226 from the NID 124 by sending downstream commands to: reset the NID 124 into normal mode of operation; disengage the subscriber loop 116; and place modem 320 into a loop-back mode operation.

The testing device 310 sends a stream of predetermined data and compares the received looped-back data to determine the bit-error-rate or transmission performance of the premise loop 226. In addition, test device 310 communicates with and commands NID processor 212 to download operational data stored in diagnostic memory 236 for analysis.

Application software resident in the test device 310 accepts and processes the downloaded operational and transmission data to analyze and determine possible causes of the service failure.

Alternatively, the testing device 310 may also test the subscriber loop from the NID 124. A command is sent by the testing device 310 to: reset the NID 124 into a normal mode of operation; disengage the premise loop 226 and place the corresponding ATU-C 113 (subscriber interface card) into a loop-back mode of operation. Operational and transmission data is fetched from diagnostic memory 236 and data is sent to the ATU-C 113 which is looped-back to the testing device 310 for analysis.

The NID 124 is also remotely accessible by the central office 106. In the event that premise-based testing is inconclusive and service provider involvement is necessary, the service provider may place the NID 124 in loop-back mode and upload operational and transmission data from diagnostic memory 236. More specifically, the service provider at the CO 106 may place its own test equipment 402 on the ATU-C card 113 connected to the subscriber loop 116 to conduct diagnostic testing. From the CO 106, testing may be done on only the subscriber loop 116 or on the subscriber loop 116 and the premise loop 226. To only test the subscriber loop 116, commands are sent from the testing device at the CO 106, to: reset the NID 124 into a normal mode of operation; disengage the premise loop 226 and place the network side of the NID 124 into a loop-back mode of operation. To test the entire transmission link, namely the subscriber loop 116 and the premise loop 226, commands are sent from the testing device at the CO 106, to: reset the NID 124 into a normal mode of operation; and place the modem 330 into a loop-back mode of operation. Thereafter, a series of predetermined data streams are sent downstream for the NID 124 to be returned back on an upstream data carrier for analysis. Moreover, a subsequent command is sent to the NID 124 to send back to the service provider, operational data from diagnostic memory 236. Preferably, the operational data sent back will include data relating to the premise loop 226, subscriber loop 116 and NID 124. Upon receipt of the operational and transmission data, service personnel at the CO 106 may further analyze the operational data to determine possible causes of the service failure.

To further isolate the possible causes of service failure, the NID 124 further includes a maintenance network jack 282 connected to a separate maintenance telephone line 280 (MTL) accessible by either the subscriber or the service provider. The MTL 280 is an alternative pathway which is characteristically similar in line quality (transmission characteristics) to the subscriber loop 116. Alternatively, the MTL 280 may be a standard telephone line wherein test data is sent at lower speeds or within transmission characteristics which would ensure the reception of accurate and reliable data. The MTL 280 is accessible by dialing a standard telephone number and then entering a password. For the service provider, the MTL 280 provides a means of bypassing the subscriber loop and immediately determining whether the source of the service failure is related to the subscriber loop 116 or the premise loop 226. For the subscriber, the MTL 280 may be used to verify that the premise loop 226 is operational before calling the service provider for technical assistance.

To test the premise loop 226, a command is sent by a testing device connected to the other end of the MTL 80, to instruct the NID 124 to: reset the NID 124 into a normal mode of operation; disengage the subscriber loop and place the modem 330 into a loop-back mode of operation. By-passing the existing subscriber loop 116, the service provider is able to remotely access the premise loop 226 and join the premise loop 226 to the MTL 280 so as to function as an alternate subscriber loop 116.

To test the subscriber loop 116, a command is sent by the testing device connected to the other end of the MTL 80, to instruct the NID 124 to: reset the NID 124 into a normal mode of operation; disengage the premise loop and place the ATU-C 113 into a loop-back mode of operation. In the event that more than one subscriber loop 116 and premise loop 226 are terminated at the NID 124, the service provider may through an addressed command, engage or disengage the selected subscriber loop 116 and/or premise loop 226. In either case, commands are sent to the NID 124 to download from diagnostic memory 236 operational and transmission data just prior to or after the occurrence of the service failure. Thereafter, test data is sent and compared with the received data after being looped-back at either the modem 330 or the ATU-C 113 (subscriber interface card). Moreover, test equipment at the CO 106 may be used to simulate subscriber terminating equipment to measure the performance of the subscriber loop 116.

The foregoing description of an embodiment of the present invention should be considered as illustrative and not as limiting. The disclosed variations in the implementation of testing subscriber and premise loops are indicative of the many possible embodiments to the present invention. Various other changes and modifications will occur to those skilled in the art for accomplishing the same result, and for operating in substantially the same way without departing from the true scope of the invention as defined in the claims appended hereto.

What is claimed is:

1. A method of monitoring and testing a transmission link between a service provider's point-of-presence (POP) and a subscriber terminating equipment (STE), comprising:
   connecting a network interface device (NID) at a subscriber premise and between a subscriber loop and a premise loop, the NID having a subscriber side and a network side, the subscriber loop being connected to the network side of the NID and the premise loop being connected to the subscriber side of the NID;
   monitoring transmission data passing through the NID and between the subscriber loop and the premise loop;
   generating operational data indicative of the operational status of the transmission link, the transmission link comprising the premise loop and the subscriber loop;
   continuously storing in a first memory within the NID, transmission data and operational data; and
   upon a detection of a service failure on the transmission link, storing within a second memory within the NID, the transmission and operational data stored in the first memory.

2. The method of claim 1, further comprising the step of sending a command to the NID to transmit the transmission and operational data stored in the second memory to the STE for analysis.

3. The method of claim 2, further comprising the step of sending a command to the NID to disengage the subscriber loop connected to the NID.

4. The method of claim 3, further comprising the step of sending a command to the NID to place the subscriber side of the NID in loop-back mode.

5. The method of claim 4, further comprising the steps of: sending a stream of predetermined test data from the STE to the NID; receiving data from the NID; and comparing received data with the predetermined test data.

6. A method of monitoring and testing a digital subscriber line between a service provider point-of-presence (POP) and a subscriber terminating equipment (STE), comprising:
   connecting a network interface device (NID) at a subscriber premise and between a subscriber loop and a premise loop, the NID having a subscriber side and a network side, the subscriber loop being connected to the network side of the NID and the premise loop being connected to the subscriber side of the NID;
   monitoring a transmission data passing through the NID and between the subscriber loop and the premise loop;
   generating operational data indicative of the operational status of the digital subscriber line, the digital subscriber line comprising the premise loop and the subscriber loop;
   continuously storing in a short-term memory within the NID, transmission data and operational data; and
   upon a detection of a service failure on the digital subscriber line, storing within a long-term memory within the NID, the transmission and operational data stored in the short-term memory.

7. The method of claim 6, further comprising the step of sending a command to the NID to transmit the transmission and operational data stored in the second memory to the STE for analysis.

8. The method of claim 7, further comprising the step of sending a command to the NID to disengage the subscriber loop connected to the NID.

9. The method of claim 8, further comprising the step of sending a command to the NID to place the subscriber side of the NID in loop-back mode.

10. The method of claim 9, further comprising the steps of: sending a stream of predetermined test data from the STE to the NID; receiving data from the NID; and comparing received data with the predetermined test data.

11. An apparatus for monitoring and testing a digital subscriber line comprising:
   a processor for monitoring transmission data passing through the digital subscriber line and for generating operational data indicative of the operational status of the digital subscriber line, the digital subscriber line comprising a premise loop and a subscriber loop;
   a short-term memory means for continuously storing transmission data and operational data sent to the short-term memory means by the processor;
   a long-term memory means for storing the transmission and operational data upon a detection of a service failure on the digital subscriber line, the short-term memory means and the long-term being under the direct control of the processor;
   a maintenance jack in communication with the processor for connecting a maintenance telephone line to the processor; and
   a plurality of subscriber jacks connected to the processor and operative for connecting with the premise loop; and
   a plurality of network jacks connected to the processor and to the plurality of subscriber jacks and operative for connecting to the subscriber loop.

12. The apparatus of claim 11, wherein the long term memory means is in communication with the short term memory means and is operative for accepting operational and transmission data from the short-term memory means.

13. The apparatus of claim 12, wherein the processor controls a connection between the subscriber jacks and the premise loop and a connection between the network jacks and the subscriber loop.

14. The apparatus of claim 13, wherein the processor is responsive to commands to engage and disengage the connection between the subscriber jacks and the premise loop and the connection between the network jacks and the subscriber loop.

* * * * *